United States Patent
Gerardo Castro et al.

(10) Patent No.: US 11,586,862 B2
(45) Date of Patent: Feb. 21, 2023

(54) ENHANCED OBJECT DETECTION WITH CLUSTERING

(71) Applicant: Ford Global Technologies, LLC, Dearborn, MI (US)

(72) Inventors: Marcos Paul Gerardo Castro, Mountainview, CA (US); Jinhyoung Oh, Union City, CA (US); Jinesh Jain, Palo Alto, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 378 days.

(21) Appl. No.: 16/791,084

(22) Filed: Feb. 14, 2020

(65) Prior Publication Data

US 2021/0256321 A1    Aug. 19, 2021

(51) Int. Cl.
| | |
|---|---|
| G06K 9/62 | (2022.01) |
| G06V 20/56 | (2022.01) |
| G06V 20/58 | (2022.01) |
| G05D 1/02 | (2020.01) |
| G01C 21/28 | (2006.01) |
| B60W 50/00 | (2006.01) |

(52) U.S. Cl.
CPC ....... *G06K 9/6269* (2013.01); *B60W 50/0098* (2013.01); *G05D 1/0223* (2013.01); *G06V 20/56* (2022.01); *G05D 2201/0213* (2013.01)

(58) Field of Classification Search
None
See application file for complete search history.

(56) References Cited

U.S. PATENT DOCUMENTS 5,977,906 A * 11/1999 Ameen ............... G01S 13/931
342/174
9,599,702 B1 * 3/2017 Bordes .................. G01S 13/18
(Continued)

FOREIGN PATENT DOCUMENTS

| | | | | |
|---|---|---|---|---|
| CN | 107121677 A | * | 9/2017 | ......... G01S 13/9303 |
| CN | 106291503 B | | 12/2018 | |

(Continued)

OTHER PUBLICATIONS

Stolz, M., et al., "An Adaptive 3D Grid-Based Clustering Algorithm for Automotive High Resolution Radar Sensor," Research Gate Conference Paper, Sep. 2018, 8 pages.

*Primary Examiner* — Mohammed Rachedine
(74) *Attorney, Agent, or Firm* — Frank A. MacKenzie; Bejin Bieneman PLC (57) ABSTRACT

A computer includes a processor and a memory storing instructions executable by the processor to collect a plurality of data sets, each data set from a respective sensor in a plurality of sensors, and each data set including a range, an azimuth angle, and a range rate for a detection point of the respective one of the sensors on an object to determine, for each detection point, a radial component of a ground speed of the detection point based on the data set associated with the detection point and a speed of a vehicle, and to generate a plurality of clusters, each cluster including selected detection points within a distance threshold from each other and having respective radial components of ground speeds that are (1) above a first threshold and (2) within a second threshold of each other.

17 Claims, 4 Drawing Sheets

(56) References Cited

U.S. PATENT DOCUMENTS

| | | | | |
|---|---|---|---|---|
| 2002/0019697 A1* | 2/2002 | Cong | ................... | G01S 13/723 |
| | | | | 701/300 |
| 2002/0044081 A1* | 4/2002 | Cong | ................... | G01S 13/931 |
| | | | | 342/195 |
| 2019/0361106 A1* | 11/2019 | Stachnik | ................. | G01S 13/42 |

FOREIGN PATENT DOCUMENTS

| | | |
|---|---|---|
| CN | 109581312 A | 4/2019 |
| CN | 110161464 A | 8/2019 |
| JP | 2018005786 A | 1/2018 |

* cited by examiner

ENHANCED OBJECT DETECTION WITH CLUSTERING

BACKGROUND

Vehicles, such as passenger cars, typically include sensors to collect data about a surrounding environment. The sensors can be placed on or in various parts of the vehicle, e.g., a vehicle roof, a vehicle hood, a rear vehicle door, etc. The sensors can collect data about an object, such as a target vehicle, a pedestrian, etc. A computer of the vehicle can process the data to control including to adjust operation of the vehicle.

DETAILED DESCRIPTION

A system includes a computer including a processor and a memory, the memory storing instructions executable by the processor to collect a plurality of data sets, each data set from a respective sensor in a plurality of sensors, and each data set including a range, an azimuth angle, and a range rate for a detection point of the respective one of the sensors on an object, determine, for each detection point, a radial component of a ground speed of the detection point based on the data set associated with the detection point and a speed of a vehicle, and generate a plurality of clusters, each cluster including selected detection points within a distance threshold from each other and having respective radial components of ground speeds that are (1) above a first threshold and (2) within a second threshold of each other.

The instructions can further include instructions to determine, for each detection point, the radial component of the ground speed based on a position on the vehicle of the respective one of the plurality of sensors that collected the data set associated with the detection point.

The instructions can further include instructions to filter the detection points to remove the detection points having a respective radial component of the ground speed below the first threshold and to generate the plurality of clusters with the filtered detection points.

The instructions can further include instructions to identify a plurality of indexes, each index indicating, in a first array of the radial components of the ground speed, one of the radial components of the ground speed exceeding the first threshold.

The instructions can further include instructions to generate a second array of the radial components of the ground speed, each element of the second array being a value of the radial components of the ground speed associated with one of the plurality of identified indexes of the first array.

The instructions can further include instructions to generate the plurality of clusters based on identified detection points having respective radial components of the ground speed in the second array.

The instructions can further include instructions to identify a first detection point, to identify a plurality of detection points within the distance threshold of the first detection point, and to generate a cluster including the first detection point and the identified plurality of detection points.

The instructions can further include instructions to identify a second plurality of detection points within the distance threshold of the identified plurality of detection points and to generate a cluster including the first detection point, the identified plurality of detection points, and the identified second plurality of detection points.

The instructions can further include instructions to generate a second cluster including identified detection points of the cluster within the second threshold of the radial component of the ground speed of the first detection point.

The instructions can further include instructions to remove identified detection points from the second cluster having a respective radial component of the ground speed below the first threshold.

The instructions can further include instructions to associate each of the plurality of clusters with a different object.

The instructions can further include instructions to, for each detection point, determine the radial component of the ground speed based on a mounting angle of the one of the plurality of sensors that collected the data set associated with the detection point.

A method includes collecting a plurality of data sets, each data set from a respective sensor in a plurality of sensors, and each data set including a range, an azimuth angle, and a range rate for a detection point of the respective one of the sensors on an object, determining, for each detection point, a radial component of a ground speed of the detection point based on the data set associated with the detection point and a speed of a vehicle, and generating a plurality of clusters, each cluster including selected detection points within a distance threshold from each other and having respective radial components of ground speeds that are (1) above a first threshold and (2) within a second threshold of each other.

The method can further include determining, for each detection point, the radial component of the ground speed based on a position on the vehicle of the respective one of the plurality of sensors that collected the data set associated with the detection point.

The method can further include filtering the detection points to remove the detection points having a respective radial component of the ground speed below the first threshold and generating the plurality of clusters with the filtered detection points.

The method can further include identifying a plurality of indexes, each index indicating, in a first array of the radial components of the ground speed, one of the radial components of the ground speed exceeding the first threshold.

The method can further include generating a second array of the radial components of the ground speed, each element of the second array being a value of the radial components of the ground speed associated with one of the plurality of identified indexes of the first array.

The method can further include generating the plurality of clusters based on identified detection points having respective radial components of the ground speed in the second array.

The method can further include identifying a first detection point, identifying a plurality of detection points within the distance threshold of the first detection point, and generating a cluster including the first detection point and the identified plurality of detection points.

The method can further include identifying a second plurality of detection points within the distance threshold of the identified plurality of detection points and generating a cluster including the first detection point, the identified plurality of detection points, and the identified second plurality of detection points.

The method can further include generating a second cluster including identified detection points of the cluster within the second threshold of the radial component of the ground speed of the first detection point.

The method can further include removing identified detection points from the second cluster having a respective radial component of the ground speed below the first threshold.

The method can further include associating each of the plurality of clusters with a different object.

The method can further include, for each detection point, determining the radial component of the ground speed based on a mounting angle of the one of the plurality of sensors that collected the data set associated with the detection point.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Detecting objects with Doppler sensors, e.g., radar, lidar, ultrasonic transducers, etc., allows a vehicle to identify a plurality of objects to avoid while operating on a roadway. Multiple detection points from a plurality of Doppler sensors can more readily identify objects than a single Doppler sensor. Clustering the detection points with a clustering algorithm can specify different objects on a roadway. That is, clustering detection points according to two-dimensional spatial proximity and one-dimensional velocity measurements allows a computer of the vehicle to identify and avoid objects approaching the vehicle. The three-dimensional approach to clustering disclosed herein that considers both the velocities and the spatial proximity of detection points can identify objects more quickly than a temporal technique such as a Kalman filter. That is, because temporal techniques use data over a specified period of time, the computer waits until the period of time elapses before identifying the objects, whereas the clustering disclosed herein can identify the objects upon receipt of detection points without waiting for the period of time to elapse. For example, a Kalman filter may require at least two cycles of detections to identify an object, while a clustering algorithm that uses both spatial and velocity measurements can identify the object upon collecting the detection points, i.e., on a first cycle of detection.

Figure 1:
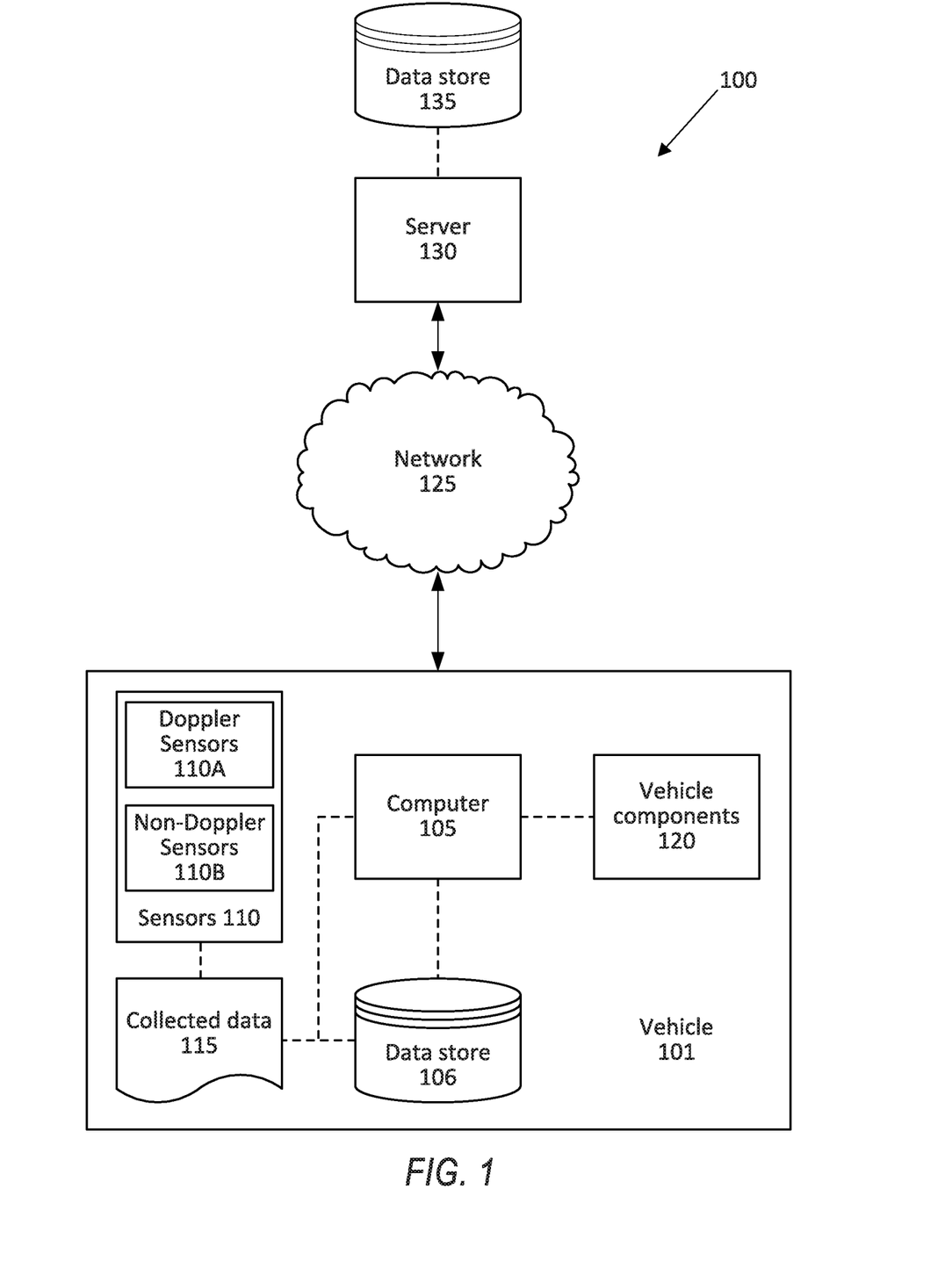
FIG. 1 is a block diagram of an example system for identifying an object.

FIG. 1 illustrates an example system 100 for identifying an object. A computer 105 in a vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110. The data store 106 can be a separate device from the computer 105, and the computer 105 can retrieve information stored by the data store 106 via a network in the vehicle 101, e.g., over a CAN bus, a wireless network, etc. Alternatively or additionally, the data store 106 can be part of the computer 105, e.g., as a memory of the computer 105.

Sensors 110 can include a variety of devices, including Doppler sensors 110A and non-Doppler sensors 110B. A "Doppler" sensor 110A is a sensor that collects data 115 by emitting a waveform (such as an acoustic or electromagnetic signal) and receiving a return waveform that can be shifted by the Doppler effect. The data 115 can include, e.g., range, azimuth, range rate, etc., as described below. Example Doppler sensors 110A include, e.g., short range radar, long range radar, lidar, and/or ultrasonic transducers. Sensors 110 that are not Doppler sensors 110A are non-Doppler sensors 110B. For example, various controllers in a vehicle 101 may operate as non-Doppler sensors 110B to provide data 115 via the vehicle 101 network or bus, e.g., data 115 relating to vehicle speed, acceleration, position, subsystem and/or component status, etc. Further, other non-Doppler sensors 110B could include cameras, motion detectors, etc., i.e., sensors 110B to provide data 115 for evaluating a position of a component, evaluating a slope of a roadway, etc.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data. The collected data 115 can be stored in the data store 106.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. When the computer 105 operates the vehicle 101, the vehicle 101 is an "autonomous" vehicle 101. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Examples of communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
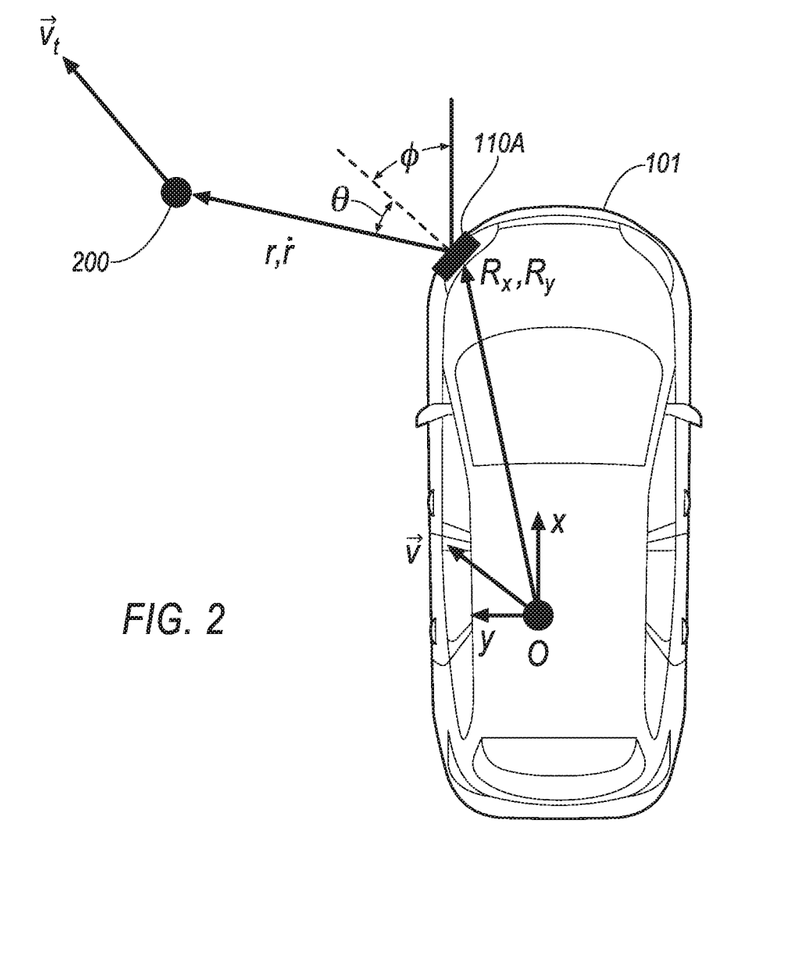
FIG. 2 is a top-down view of a host vehicle.

FIG. 2 is a top-down view of a vehicle 101 with a Doppler sensor 110A. The vehicle 101 can include a plurality of Doppler sensors 110A, one of which is illustrated in FIG. 2. The host vehicle 101 defines a coordinate system, e.g., a two-dimensional coordinate system with respect to an origin O. The coordinate system defines a longitudinal axis x and a lateral axis y extending from the origin O at a predetermined reference point of the host vehicle 101. The reference point can be, e.g., a center point of a passenger cabin of the host vehicle 101, a center point of a front bumper of the host vehicle 101, a centroid of the host vehicle 101, etc. The longitudinal axis x extends along vehicle-forward direction, i.e., the direction in which a propulsion moves the vehicle 101 when a steering component is at a neutral position. The lateral axis γ extends perpendicular to the longitudinal axis x, i.e., a cross-vehicle direction. The host vehicle 101 has a velocity $\vec{v}$ that includes a longitudinal velocity $v_x$ along the longitudinal axis x and a lateral velocity $v_y$ along the lateral axis γ. The host vehicle yaw rate $\dot{\psi}$ is the time rate of change of a heading angle of the vehicle 101.

Each Doppler sensor 110A defines a mounting location $R_x$, $R_y$ and a mounting angle $\phi$ in the coordinate system. The mounting location $R_x$, $R_y$ is a pair of (x, y) coordinates in the coordinate system of the location of the Doppler sensor 110A relative to the origin O. That is, the mounting location includes a longitudinal position $R_x$ and a lateral position $R_y$ of the Doppler sensor 110A. The mounting angle $\phi$ is an angle defined between the longitudinal axis x and a line extending from the origin O to the Doppler sensor 110A.

Each Doppler sensor 110A collects data 115 from an object at a "detection point," i.e., a point from which the Doppler sensor 110A receives data 115 from the object. For example, a radar 110A emits a radar signal toward the object, and the radar signal reflects off the object at a first detection point 200. The radar 110A receives the reflected radar signal and, based on a time difference between emission of the radar signal and receipt of the reflected radar signal, the radar 110A can determine, as described below, a range, an azimuth angle, and a range rate between the radar 110A and the detection point 200. Each detection point 200 defines a data set S of data 115 including a range r, an azimuth angle θ, and a range rate $\dot{r}$. The "range" r is a relative straight-line distance between the Doppler sensor 110A and the detection point 200 in the coordinate system. The "azimuth angle" θ is an angle defined between a central axis of the sensor 110 and a line extending from the Doppler sensor 110A to the detection point 200. The azimuth θ is thus a detection angle between the Doppler sensor 110A and the detection point 200. The "range rate" r is a time rate of change of the range r. The range rate $\dot{r}$ is a "Doppler velocity," i.e., a radial component of a relative velocity between the host vehicle 101 and the detection point 200.

The object, which may be a moving target vehicle, has a ground velocity $\vec{v}_t$, i.e., a velocity relative to the ground. The object has a linear velocity $v_{t,x}, v_{t,y}$. The "linear velocity" is the ground velocity $\vec{v}_t$ of the object represented in the coordinate system, including a longitudinal velocity $v_{t,x}$ along the longitudinal axis x and a lateral velocity $v_{t,y}$ along the lateral axis γ. That is, the linear velocity $v_{t,x}, v_{t,y}$ is the set of components of the ground velocity $\vec{v}_t$ in the coordinate system.

Figure 3:
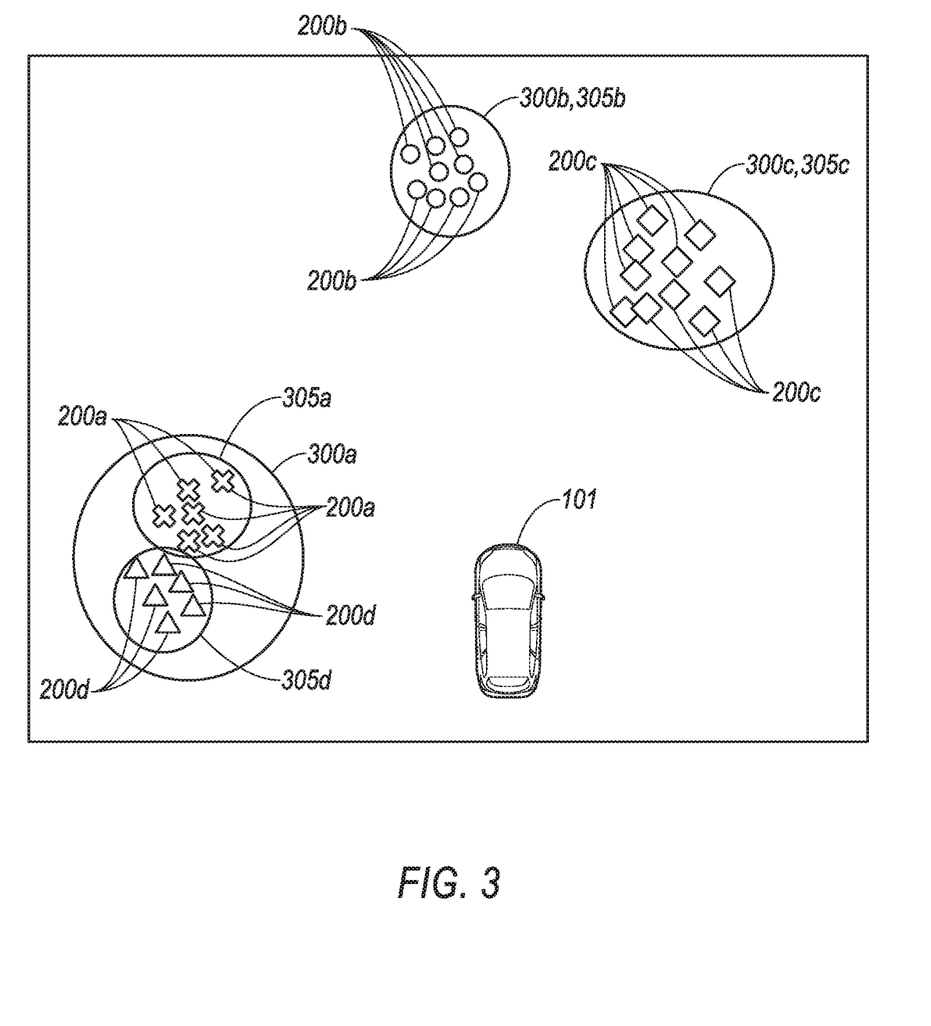
FIG. 3 is a top-down view of the host vehicle detecting a plurality of detection points.

FIG. 3 is a top-down view of the vehicle 101 and a plurality of detection points 200. Each detection point 200 corresponds to a data set from a Doppler sensor 110A, e.g., a radar, a lidar, an ultrasonic transducer, etc. As described below, the computer 105 can identify objects associated with the detection points 200 by generating clusters 300, 305 of detection points 200. The detection points 200 are illustrated with different shapes to represent the clusters 300, 305 associated with the detection points 200, including detection points 200a, 200b, 200c, and 200d.

The computer 105 can determine a radial component of the ground velocity $\vec{v}_t$ of the object, i.e., a "radial velocity" $\gamma_i$, for an ith detection point:

$$\gamma_i = \dot{r}_i + (v_y + R_i \dot{\psi}) \sin(\theta_i + \phi) + (v_x - R_y \dot{\psi}) \cos(\theta_i + \phi) \quad (1)$$

That is, the ground velocity $\vec{v}_t$ can be represented in polar coordinates from the origin O, defining a radial velocity γ that is a rate of change of the position of the detection point along a line extending from the origin O to the detection point and a tangential velocity ω that is a rate of change of an angle defined between the longitudinal axis x and the line connecting the origin O to the detection point 200. The vehicle 101 includes a plurality of radars 110A, one of which is shown in FIG. 2. The radar 110A can detect a plurality of detection points 200, and the index i refers to one of the detection points 200 detected by the radar 110A, as described above. For example, a first detection point 200 from the radar 110A has a radial velocity $\gamma_1$.

The radial velocity $\gamma_i$ can be represented in terms of the linear velocity $v_{t,x}, v_{t,y}$ of the detection point:

$$\gamma_i = v_{t,x,i} \cos(\theta_i + \phi) + v_{t,y,i} \sin(\theta_i + \phi) \quad (2)$$

where $v_{t,x,i}$ is the longitudinal ground velocity of the ith detection point 200 detected by the radar 110A, and $v_{t,y,i}$ is the lateral ground velocity of the ith detection point 200 detected by the radar 110A.

The computer 105 can identify "moving" detection points 200 and "static" detection points 200. A "moving" detection point 200 is a detection point 200 having a respective radial velocity $\gamma_i$ above a threshold. The threshold can be an empirically determined value based on, e.g., a resolution of the radar 110A, virtual simulations of vehicles 101 and objects moving at specified speeds and azimuth angles, etc. A "static" detection point 200 is a detection point 200 having a respective radial velocity $\gamma_i$ below the threshold. To identify the moving and static detection points 200, the computer 105 can arrange the radial velocities $\gamma_i$ into an array $\Gamma=[\gamma_1, \gamma_2, \ldots \gamma_n]$ for n detection points 200. That is, an element of the array $\Gamma_i$ is a radial velocity $\gamma_i$ corresponding to the index i, i.e., $\Gamma_i=\gamma_i$. The computer 105 can, for each index i, determine whether the radial velocity $\gamma_i$ exceeds the speed threshold $\bar{\gamma}$ and store the indexes of the radial velocities $\gamma_i$ exceeding the threshold $\bar{\gamma}$ in an index array I:

$$I=[i], \Gamma_i \geq \bar{\gamma} \qquad (3)$$

Upon determining the index array, the computer 105 can determine a set of moving detection points 200 $S_{moving}=[S_i]$, $i \in I$ and a set of static detection points 200 $S_{static}=[S_i], i \notin I$. The computer 105 can identify an array $\Gamma_{moving}$ of radial velocities $\gamma_i$ corresponding to the set $S_{moving}$: $\Gamma_{moving}=[\gamma_i]$, $i \in 1$. Thus, the computer 105 can identify detections points 200 corresponding to stationary and moving objects. That is, a "stationary" object is an object associated with a cluster of static detection points, and a "moving" object is an object associated with a cluster of moving detection points.

The computer 105 can generate one or more clusters 300, 305 based on the sets of moving or static detection points $S_{static}, S_{moving}$. A "cluster" is a set of detection points 200 that are associated with a single type of associated value, e.g., within a Euclidian distance threshold of each other, within a speed threshold of each other, within a Mahalanobis distance of each other, having radial velocities with a threshold of each other, etc. In FIG. 3, the clusters 300, 305 are denoted with the circular boundaries around the detection points 200, and the clusters 305 are smaller clusters within a larger cluster 300. A "larger" cluster 300, 305 is a cluster 300, 305 that includes more detection points 200 than another cluster 300, 305, which is a "smaller" cluster. In the example of FIG. 3, the cluster 300a is "larger" than the clusters 305a, 305d because the cluster 300a includes the detection points 200a, 200d, which include more detection points 200 than the cluster 305a (which only includes the detection points 200a) or the cluster 305d (which only includes the detection points 200d).

In the example of FIG. 3, the clusters 300 are spatial clusters and the clusters 305 are velocity clusters. A "spatial cluster" 300 is a cluster in which the single value associated with the detection points 200 is a spatial distance value, e.g., all of the detection points 200 are within a spatial distance threshold (e.g. Euclidean distance, Mahalanobis distance, etc.) of at least one other detection point 200 in the cluster 300. A "velocity cluster" 305 is a subset of the spatial cluster 300 in which the single value associated with the detection points 200 is a velocity value, e.g., all of the detection points 200 have a velocity within a specified threshold (e.g., the radial velocity threshold described above) of at least one other detection point 200 in the cluster 305. In the example of FIG. 3, the computer 105 generates spatial clusters 300 and then generates velocity clusters 305 from the spatial clusters 300. Alternatively, the computer 105 can consider both distance and velocity to generate clusters 300. Yet alternatively, the computer 105 can generate velocity clusters 305 first and then generate spatial clusters 300 from the velocity clusters 305.

The computer 105 can generate a spatial cluster 300 by selecting one of the moving detection points 200 and then identifying all moving detection points 200 that are within a distance threshold of the selected detection point 200. The distance threshold can be an empirically determined value, i.e., based on testing Doppler sensors 110A detecting test objects and determining a minimum distance beyond which detection points 200 correspond to different objects, e.g., 0.5 meters. Then, the computer 105 can identify detection points 200 within the distance threshold of all currently identified detection points 200, i.e., all detection points 200 within the distance threshold of the previously identified detection points 200. For example, the cluster 300a includes a plurality of detection points 200a, 200d within the distance threshold of each other. The computer 105 can continue to identify detection points 200 until no detection points 200 remain within the distance threshold of any previously identified detection points 200. Upon completing the first spatial cluster 300a, the computer 105 can generate a velocity cluster 305a, as described below. Upon identifying the velocity cluster 305a, the computer 105 can identify a detection point 200 that is not in the velocity cluster 305a and generate a second spatial cluster 300b. The computer 105 can identify a third spatial cluster 300c that includes the detection points 200c. Alternatively or additionally, the computer 105 can generate the spatial cluster 300 with a clustering algorithm, e.g., DBSCAN.

Upon identifying a spatial cluster 300, the computer 105 can generate a velocity cluster 305 based on the respective radial velocities $\gamma_i$ of the detection points. As described above, a velocity cluster 305 is a cluster in which the respective radial velocities $\gamma$ of all detection points 200 are within a threshold of at least one other detection point 200 in the cluster 300. For each spatial cluster 300, the computer 105 can identify detection points within each cluster 305 are within a second threshold of each other, e.g., an empirically determined value of test vehicles operating on test roadways at different speeds, the second threshold being a minimum detectable difference between two test vehicles moving at different speeds moving along a roadway. The second threshold can be, e.g., 0.5 kilometers per hour. To generate the velocity cluster 305, the computer 105 can identify a first detection point 200 and its radial velocity $\gamma_i$. The computer 105 can identify the closest detection point 200 in the spatial cluster 300 to the first detection point 200 and compare the respective radial velocities $\gamma_i$ of the detection points 200. If the radial velocities $\gamma_i$ are within the second threshold of each other, the computer 105 can include both points in a velocity cluster 305. Otherwise, the computer 105 can identify another detection point 200. The computer 105 can then successively compare radial velocities $\gamma_i$ of the next closest detection points 200 to the first detection point 200 and generate a velocity cluster 305 of detection points 200 having respective radial velocities $\gamma_i$ within the second threshold of the radial velocity $\gamma_i$ of the first detection point 200. Alternatively or additionally, the computer 105 can generate the velocity clusters 305 with a clustering algorithm, e.g., DBSCAN.

When all the detection points 200 of a spatial cluster 300 are within the second threshold of each other, the computer 105 can generate a velocity cluster 305 for those detection points 200, i.e., the spatial cluster 300 and the velocity cluster 305 are the same. That is, the spatial cluster 300 and the velocity cluster 305 include detection points 200 from a single object. For example, the spatial cluster 300b includes detection points 200b within the second threshold of each other, and thus defines the velocity cluster 305b. In another example, the spatial cluster 300c includes detection points 200c within the second threshold of each other, and thus defines the velocity cluster 305c. Upon identifying the velocity clusters 305 for the spatial cluster 300, the computer 105 can identify a second spatial cluster 300 from the detection points 200 not currently in a cluster 300, 305. Alternatively, the computer 105 can identify a first detection point 200 and then identify detection points 200 having a position within a distance threshold and a radial velocity γ within a threshold, i.e., the computer 105 considers both distance and radial velocity γ in a single clustering step. The computer 105 can assign these identified points 200 to a single cluster 300.

The computer 105 can associate each velocity cluster 305 with an object. Each object is thus defined by the set of detection points 200 that are within the distance threshold, and that are within the speed threshold of each other. The computer 105 can determine a respective ground velocity $\vec{v}_t$ of the object associated with each cluster 300, 305 based on the data 115 associated with each detection point 200. For example, based on the radial velocities $\gamma_1$ collected by a plurality of Doppler sensors 110A, the computer 105 can determine a ground velocity $\vec{v}_t$ and a yaw rate $\psi_t$ for each object, as described in U.S. patent application Ser. No. 16/752,726, fully incorporated herein by reference in its entirety.

The computer 105 can determine a radial velocity $\gamma_k^n$ for an nth radar and a kth detection point 200 within one of the velocity clusters 305. The computer 105 can determine the radial velocity $\gamma_k^n$ for an object associated with one of the velocity clusters 305 can be represented in terms of the linear velocity $v_{t,x}, v_{t,y}$ of the detection point 200:

$$\gamma_k^n v_{t,x,k}^n \cos(\theta_k^n + \phi^n) + v_{t,y,k}^n \sin(\theta_k^n + \phi^n) \quad (4)$$

where $v_{t,x,k}^n$ is the longitudinal ground velocity of the kth detection point 200 detected by the nth radar 110A, and $v_{t,y,k}^n$ is the lateral ground velocity of the kth detection point 200 detected by the nth radar 110A. In this context, n, k are natural numbers, i.e., positive integers. The computer 105 can determine the radial velocity $\gamma_k^n$ according to Equation 1 above and can use the value of the radial velocity $\gamma_k^n$ in Equation 4 to determine the linear velocity $v_{t,x,k}^n, v_{t,y,k}^n$, of the object However, for a single detection point 200, Equation 4 has two unknown values: $v_{t,x,k}^n, v_{t,y,k}^n$, and thus data 115 from a single detection point 200 cannot be used to solve for both $v_{t,x,k}^n, v_{t,y,k}^n$.

The computer 105 can determine the linear velocity $v_{t,x}, v_{t,y}$ based on a plurality of radial velocities γ from a plurality of radars 110A. That is, the computer 105, including programming thereof, can be means for determining the linear velocity $v_{t,x}, v_{t,y}$ based on a plurality of radial velocities γ from a plurality of radars 110A, e.g., based on at least three radial velocities γ from at least two radars 110A as described below. Each radial velocity γ corresponds to respective lateral and longitudinal components of the linear velocity $v_{t,x}, v_{t,y}$, for each kth detection of the nth radar 110, introducing two additional unknown values $v_{t,x,k}^n, v_{t,y,k}^n$ for each determination of $\gamma_k^n$. For example, three radial velocities $\gamma_1^1, \gamma_2^1, \gamma_3^1$ represented in Equation 2 would result in six values for the linear velocity $v_{t,x,k}^n, v_{t,y,k}^n$. To reduce the number of unknown values, the computer 105 can represent the linear velocity $v_{t,x,k}^n, v_{t,y,k}^n$ of each detection point 200 in terms of the linear velocity $v_{t,x}, v_{t,y}$ of one of the detection points 200. Because the object is a rigid body, the linear velocity $v_{t,x}, v_{t,y}$, for each detection point 200 is related by the yaw rate ψ of the object:

$$v_{t,x,k}^n = v_{t,x,1}^1 - \dot{\psi}_t r_{k,1,y} \quad (5)$$

$$v_{t,y,k}^n = v_{t,y,1}^1 - \dot{\psi}_t r_{k,1,x} \quad (6)$$

where $v_{t,x,1}^1$ is the longitudinal component of the linear velocity at a first detection point 200, $v_{t,y,1}^1$ is the lateral component of the linear velocity at the first detection point 200, $r_{k,1,x}$ is the longitudinal component of the range r between the nth radar 110A and the first detection point 200, and $r_{k,1,y}$ is the lateral component of the range r between the nth radar 110A and the first detection point 200. Thus, rather than introducing two new unknown values for each new detection point 200, each radial velocity $\gamma_k^n$ can be expressed in terms of the linear velocity $v_{t,x,1}^1, v_{t,y,1}^1$ and yaw rate ψ of one of the detection points 200, i.e., solving for only three variables. Because the computer 105 only solves for three variables, the computer 105 requires a minimum of three detection points 200. The computer 105, including programming thereof, can be means for determining that the collected sets of data 115 (i.e., the detection points 200) includes at least a first set, a second set, and a third set (i.e., at least three detection points 200). The computer 105 can thus be means for determining the linear velocity $v_{t,x}, v_{t,y}$, and the yaw rate ψ upon determining that a number of collected sets of data 115 from the radars 110A exceeds three. The computer 105 can determine the linear velocity $v_{t,x}, v_{t,y}$ and the yaw rate ψ for a minimum of three detection points 200 from a minimum of two radars 110A:

$$\begin{bmatrix} \cos(\theta_1^1 + \phi^1) & \sin(\theta_1^1 + \phi^1) & F(1,1,1,1) \\ \cos(\theta_2^1 + \phi^1) & \sin(\theta_2^1 + \phi^1) & F(1,1,2,1) \\ \cos(\theta_3^2 + \phi^2) & \sin(\theta_3^2 + \phi^2) & F(2,1,3,1) \end{bmatrix} \begin{bmatrix} v_{t,x,1}^1 \\ v_{t,y,1}^1 \\ \dot{\psi}_t \end{bmatrix} - \begin{bmatrix} \gamma_1^1 \\ \gamma_2^1 \\ \gamma_3^2 \end{bmatrix} = 0. \quad (7)$$

$$F(n,m,k,j) = \{R_x^n - R_x^m - r_j^m \cos(\theta_j^m + \phi^m)\} \sin(\theta_k^n + \phi^n) - \{R_y^n - R_y^m - r_j^m \sin(\theta_j^m + \phi^m)\} \cos(\theta_k^n + \phi^n) \quad (8)$$

where F is a function that correlates the mounting locations R and mounting angles φ of the m, n indexed radars 110A and the respective ranges r and azimuth angles θ for the k, j indexed detection points 200. In this context, k, j, m, n are natural numbers, i.e., positive integers. That is, F accounts for the rigid body correlation between the linear velocities $v_{t,x}, v_{t,y}$ of any two detection points 200. By collecting detection points 200 from at least two radars 110A, the function F introduces the third column of the matrix in Equation 7. That is, for only one radar 110A, n=m, the values $R_x^n - R_x^m$ and $R_y^n - R_y^m$ become 0, and the third column of the matrix is a linear combination of first two columns, reducing the matrix to two unique columns. That is, the reduced matrix for only one radar 110A can only solve for two variables when only one radar 110A is considered, and not all three of $v_{t,x}, v_{t,y}$, and $\dot{\psi}_t$. Thus, the computer 105 actuates at least two radars 110A to collect at least three detection points 200. That is, the computer 105 can instruct the radars 110A to collect detection points 200, e.g., upon power-up of the vehicle 101, and the radars 110A can collect detection points 200 without further instruction from the computer 105. The computer 105 can retrieve the detection points 200 stored in the data store 106 over, e.g., the network 125.

The computer 105 can determine the three unknowns, the linear velocity $v_{t,x}, v_{t,y}$ and the target yaw rate $\dot{\psi}_t$, by solving the matrix of three equations listed above as Equation 5 using a conventional matrix solving technique, e.g., least squares, row reduction, etc. That is, the computer 105 can determine the linear velocity $v_{t,x}, v_{t,y}$ based on three detected radial velocities $\gamma$ from at least two radars 110A. The computer 105 can determine more than three radial velocities $\gamma$ from more than two radars 110A and can determine the linear velocity $v_{t,x}, v_{t,y}$ by solving the equations corresponding to each radial velocity $\gamma$. Equations 7-8 show determining the linear velocity $v_{t,x}, v_{t,y}$ and the target yaw rate $\dot{\psi}_t$ with data 115 from two radars 110A, and the computer 105 can use data 115 from more than two radars 110A, e.g., three radars 110A, four radars 110A, etc. Using additional radars 110A can provide additional data 115 with which the computer 105 can determine the linear velocity $v_{t,x}, v_{t,y}$ and the target yaw rate $\dot{\psi}_t$.

Upon determining the linear velocity $v_{t,x}, v_{t,y}$ and the target yaw rate $\dot{\psi}_t$, the computer 105 can actuate one or more components 120 to avoid the object. For example, the computer 105 can predict a path of the object based on the linear velocity $v_{t,x}, v_{t,y}$ and can actuate a brake to allow the object to pass the host vehicle 101 when a predicted path of the host vehicle 101 would intersect the predicted path of the object. In another example, the computer 105 can actuate a steering motor to steer the host vehicle 101 away from the object. By using data 115 from the Doppler sensors 110A to determine the linear velocity $v_{t,x}, v_{t,y}$ and the target yaw rate $\dot{\psi}_t$, the computer 105 can predict two-dimensional and three-dimensional movement of the object more rapidly than a temporal filter such as a Kalman filter. The data 115 from the Doppler sensors 110A provide information more closely dependent on the linear velocity $v_{t,x}, v_{t,y}$ and the target yaw rate $\dot{\psi}_t$ of the target than predictions from the temporal filter, providing faster convergence to the speed of the target than the temporal filter.

Figure 4:
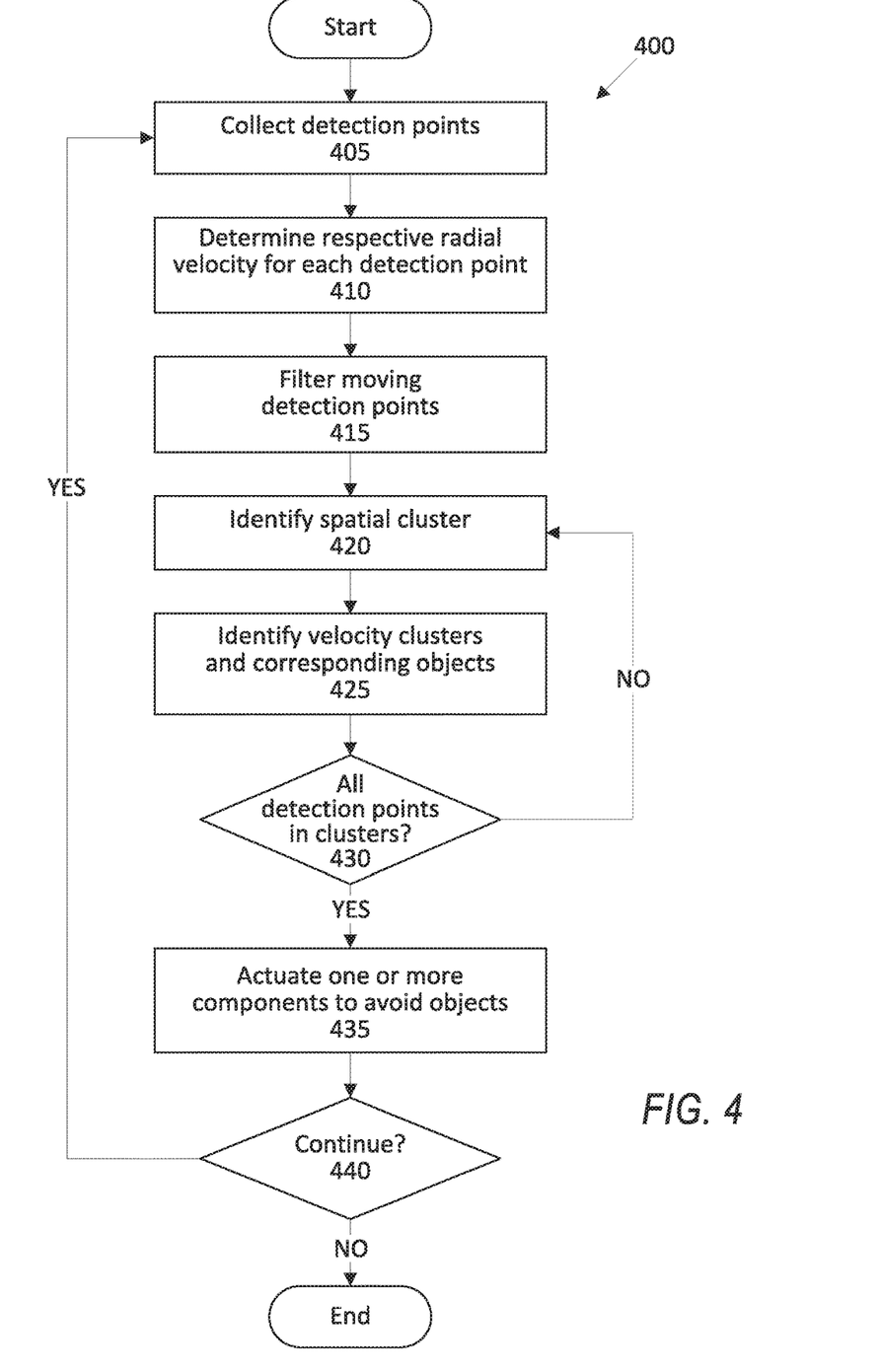
FIG. 4 is a block diagram of an example process for identifying the object.

FIG. 4 is a block diagram of an example process for identifying an object. The process 400 begins in a block 405, in which the computer 105 collects a plurality of detection points 200. As described above, the Doppler sensors 110A can collect data 115 around a host vehicle 101, and each data set is associated with a detection point 200 of an object. The Doppler sensors 110A can store the detection points in the data store 106. The computer 105 can retrieve the detection points 200 from the data store 106.

Next, in a block 410, the computer 105 determines a respective radial velocity $\gamma$ for each detection point 200. As described above, based on the data 115 associated with the detection point 200, the position of the Doppler sensor 110A on the host vehicle, and a velocity and yaw rate of the host vehicle 101, the computer 105 can determine the radial component of the ground speed of the detection point, i.e., the radial velocity $\gamma$. The computer 105 can store the radial velocities $\gamma$ as an array $\Gamma$ in the data store 106.

Next, in a block 415, the computer 105 filters moving detection points 200 from static detection points. As described above, a "moving" detection point 200 is a detection point 200 having a radial velocity $\gamma$ equal to or exceeding a threshold. A "static" detection point 200 is a detection point 200 having a radial velocity $\gamma$ below the threshold. The set of moving detection points 200 defines a set of radial velocities $\Gamma_{moving}$, and the set of static detection points 200 defines a set of radial velocities $\Gamma_{static}$.

Next, in a block 420, the computer 105 identifies a spatial cluster 300 of the moving detection points 200. As described above, a spatial cluster 300 is a set of detection points 200 within a distance threshold of at least one other detection point 200 in the spatial cluster 300. That is, the computer 105 can identify a first moving detection point 200, then can identify moving detection points 200 within a distance threshold of the first identified points 200, and then can identify additional moving detection points 200 within the distance threshold of the previously identified detection points 200 until no moving detection points 200 are within the distance threshold of the currently identified moving detection points 200. These identified moving detection points 200 define the spatial cluster 300.

Next, in a block 425, the computer 105 identifies velocity clusters 305 within the spatial cluster 300 and associates an object with each velocity cluster 305. The computer 105 can, for each spatial cluster 300, identify a first detection point 200 in the spatial cluster 300 and then identify detection points 200 within a speed threshold of the radial velocity $\gamma$ of the first detection point 200, and then identify additional detection points 200 until no detection points 200 in the spatial cluster 300 are within the speed threshold of the currently identified detection points 200. These identified detection points 200 define a velocity cluster 305. The computer 105 can identify velocity clusters 305 until all detection points 200 are part of one of the velocity clusters 305. The computer 105 can associate an object to each identified velocity cluster 305, i.e., the computer 105 can identify each velocity cluster 305 as representing a single object moving at a speed corresponding to the radial velocities $\gamma$ of the associated velocity cluster 305.

Next, in a block 430, the computer 105 determine whether there are any moving detection points 200 that are not part of a velocity cluster 305. Upon identifying the velocity clusters 305 for the spatial cluster 300, the computer 105 can identify another spatial cluster 300 starting with a moving detection point 200 that is not currently in a velocity cluster 305. If the computer 105 identifies a moving detection point 200 that is not part of a velocity cluster 305, the process 400 returns to the block 420 to identify another spatial cluster 300. Otherwise, the process 400 continues in the block 435.

In the block 435, the computer 105 actuates one or more vehicle components 120 to avoid the objects. As described above, the computer 105 can actuate a propulsion to move the host vehicle 101 away from one of the objects. In another example, the computer 105 can actuate a brake to slow or stop the host vehicle 101 until the object passes the host vehicle 101.

Next, in a block 440, the computer 105 determines whether to continue the process 400. For example, the computer 105 can determine to continue the process 400 upon passing one or more of the detected objects and determining that additional objects may have approached the vehicle 101. That is, the computer 105 can determine to continue the process 400 to collect new detection points 200 to identify additional objects. If the computer 105 determines to continue, the process 400 returns to the block 405. Otherwise, the process 400 ends.

Computing devices discussed herein, including the computer 105 and server 130, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
    collect a plurality of data sets, each data set from a respective sensor in a plurality of sensors, and each data set including a range, an azimuth angle, and a range rate for a detection point of the respective one of the sensors on an object;
    determine, for each detection point, a radial component of a ground speed of the detection point based on the data set associated with the detection point and a speed of a vehicle;
    identify a plurality of indexes, each index indicating, in a first array of the radial components of the ground speed, one of the radial components of the ground speed exceeding a first threshold;
    generate a second array of the radial components of the ground speed, each element of the second array being a value of the radial components of the ground speed associated with one of the plurality of identified indexes of the first array; and
    generate a plurality of clusters based on identified detection points having respective radial components of the ground speed in the second array, each cluster including selected detection points within a distance threshold from each other and having respective radial components of ground speeds that are (1) above the first threshold and (2) within a second threshold of each other.

2. The system of claim 1, wherein the instructions further include instructions to determine, for each detection point, the radial component of the ground speed based on a position on the vehicle of the respective one of the plurality of sensors that collected the data set associated with the detection point.

3. The system of claim 1, wherein the instructions further include instructions to filter the detection points to remove the detection points having a respective radial component of the ground speed below the first threshold and to generate the plurality of clusters with the filtered detection points.

4. The system of claim 1, wherein the instructions further include instructions to identify a first detection point, to identify a plurality of detection points within the distance threshold of the first detection point, and to generate a cluster including the first detection point and the identified plurality of detection points.

5. The system of claim 4, wherein the instructions further include instructions to identify a second plurality of detection points within the distance threshold of the identified plurality of detection points and to generate a cluster including the first detection point, the identified plurality of detection points, and the identified second plurality of detection points.

6. The system of claim 5, wherein the instructions further include instructions to generate a second cluster including identified detection points of the cluster within the second threshold of the radial component of the ground speed of the first detection point.

7. The system of claim 6, wherein the instructions further include instructions to remove identified detection points from the second cluster having a respective radial component of the ground speed below the first threshold.

8. The system of claim 1, wherein the instructions further include instructions to associate each of the plurality of clusters with a different object.

9. The system of claim 1, wherein the instructions further include instructions to, for each detection point, determine the radial component of the ground speed based on a mounting angle of the one of the plurality of sensors that collected the data set associated with the detection point.

10. A method, comprising:

collecting a plurality of data sets, each data set from a respective sensor in a plurality of sensors, and each data set including a range, an azimuth angle, and a range rate for a detection point of the respective one of the sensors on an object;

determining, for each detection point, a radial component of a ground speed of the detection point based on the data set associated with the detection point and a speed of a vehicle;

identifying a plurality of indexes, each index indicating, in a first array of the radial components of the ground speed, one of the radial components of the ground speed exceeding a first threshold;

generating a second array of the radial components of the ground speed, each element of the second array being a value of the radial components of the ground speed associated with one of the plurality of identified indexes of the first array; and generating a plurality of clusters based on identified detection points having respective radial components of the ground speed in the second array, each cluster including selected detection points within a distance threshold from each other and having respective radial components of ground speeds that are (1) above the first threshold and (2) within a second threshold of each other.

11. The method of claim 10, further comprising determining, for each detection point, the radial component of the ground speed based on a position on the vehicle of the one of the plurality of sensors that collected the data set associated with the detection point.

12. The method of claim 10, further comprising associating each of the plurality of clusters with a different object.

13. The method of claim 10, further comprising, for each detection point, determining the radial component of the ground speed based on a mounting angle of the one of the plurality of sensors that collected the data set associated with the detection point.

14. The method of claim 10, further comprising identifying a first detection point, identifying a plurality of detection points within the distance threshold of the first detection point, and generating a cluster including the first detection point and the identified plurality of detection points.

15. The method of claim 14, further comprising identifying a second plurality of detection points within the distance threshold of the identified plurality of detection points and generating a cluster including the first detection point, the identified plurality of detection points, and the identified second plurality of detection points.

16. The method of claim 15, further comprising generating a second cluster including identified detection points of the cluster within the second threshold of the radial component of the ground speed of the first detection point.

17. The method of claim 16, further comprising removing identified detection points from the second cluster having a respective radial component of the ground speed below the first threshold.

* * * * *